United States Patent [19]

Walker

[11] Patent Number: 4,486,746
[45] Date of Patent: Dec. 4, 1984

[54] DIGITAL SYSTEM FOR RASTER SCAN DISPLAY OF VIDEO AND ALPHA-NUMERICS WITH SINGLE BIT MAP MEMORY

[75] Inventor: Donald F. Walker, Anaheim, Calif.

[73] Assignee: Hughes Aircraft Company, El Segundo, Calif.

[21] Appl. No.: 324,518

[22] Filed: Nov. 24, 1981

[51] Int. Cl.³ .............................................. G09G 1/00
[52] U.S. Cl. .................................. 340/750; 340/703; 340/727; 340/721
[58] Field of Search ............... 340/721, 703, 745, 750, 340/727

[56] References Cited

U.S. PATENT DOCUMENTS

| 4,317,114 | 2/1982 | Walker | 340/721 |
| 4,352,105 | 9/1982 | Harney | 340/703 |
| 4,445,115 | 4/1984 | Rudgard | 340/728 |

Primary Examiner—Marshall M. Curtis
Attorney, Agent, or Firm—W. J. Benman, Jr.; A. W. Karambelas

[57] ABSTRACT

This invention provides a simple system for simultaneous raster scan display of video and alpha-numeric data on a single screen with provision for periodic image refreshment. It includes means for encoding the electrical signals representing the spatial intensity distribution of the video signal and the alpha-numeric signal. The coded signals are stored in a single bit map memory at the desired addresses. For display, the information is simply read from the memory through a single digital-to-analog convertor.

9 Claims, 2 Drawing Figures

DIGITAL SYSTEM FOR RASTER SCAN DISPLAY OF VIDEO AND ALPHA-NUMERICS WITH SINGLE BIT MAP MEMORY

BACKGROUND OF THE INVENTION

1. Field of the Invention

This invention relates to display systems. Specifically, this invention relates to systems which display alpha-numeric data in addition to video data such as that obtained from a radar system.

While the preferred embodiment will be described herein with reference to a particular application, it is to be understood that the invention is not limited thereto. Those of ordinary skill in the art and access to the teachings of this invention will recognize other applications within the scope thereof.

2. Description of the Prior Art

The desirability of displaying alpha-numeric characters in conjunction with radar and/or sonar returns is now widely recognized. For example, many air traffic control centers are now equipped with radar consoles which display such information as aircraft indentification, speed and altitude in proximity to the radar video signal. Such radar consoles typically generate the video image utilizing a random scan.

A random scan is one which the electron beam is deflected to draw each image individually on a phosphorescent screen. When this technique is used to display alpha-numeric data with radar video the images may begin to fade before all the information can be written. As a result, there is a limitation on the amount of data that can be displayed within a time frame determined in part by the video retention period of the display. For this reason, a raster scan such as that employed with conventional television systems is being considered as an alternative.

Raster scan provides a significant improvement over random scan in allowing the video image to be stored in memory which may be electronically refreshed periodically to prevent fading. Raster scan display of alpha-numerics with radar video typically requires two memories, often referred to as bit map memories. One for the video and one for the graphics. Each memory holds the information to be displayed until it is written on the screen line by line by the electron beam.

A raster scan system typically requires two digital-to-analog convertors to interface each digital memory with the display screen. As an alternative, the memories may be multiplexed through a single D/A convertor. In either case, prior art systems for raster scan display of video with alpha-numerics requires the synchronization of the two memories to ensure the display of alpha-numerics in proper spatial relation to video. Synchronization electronics adds to the cost, complexity and maintenance problems of raster scan systems. Thus, it has been found desirable to reduce the cost and complexity associated with such systems.

SUMMARY OF THE INVENTION

The problems associated with conventional radar or sonar systems that display alpha-numeric data can be mitigated to a large extent by the circuit and technique of the present invention. This invention provides a system for simultaneous raster scan display of video and alpha-numeric data on a single screen with minimal additional circuitry. It includes means for encoding the electrical signals representing the spatial intensity distribution of the video signal and the alpha-numeric signal. The coded signals are stored in a single bit map memory at the desired addresses. For display, the information is simply read from the memory through a single digital-to-analog convertor.

DETAILED DESCRIPTION OF THE INVENTION

Figure 1:
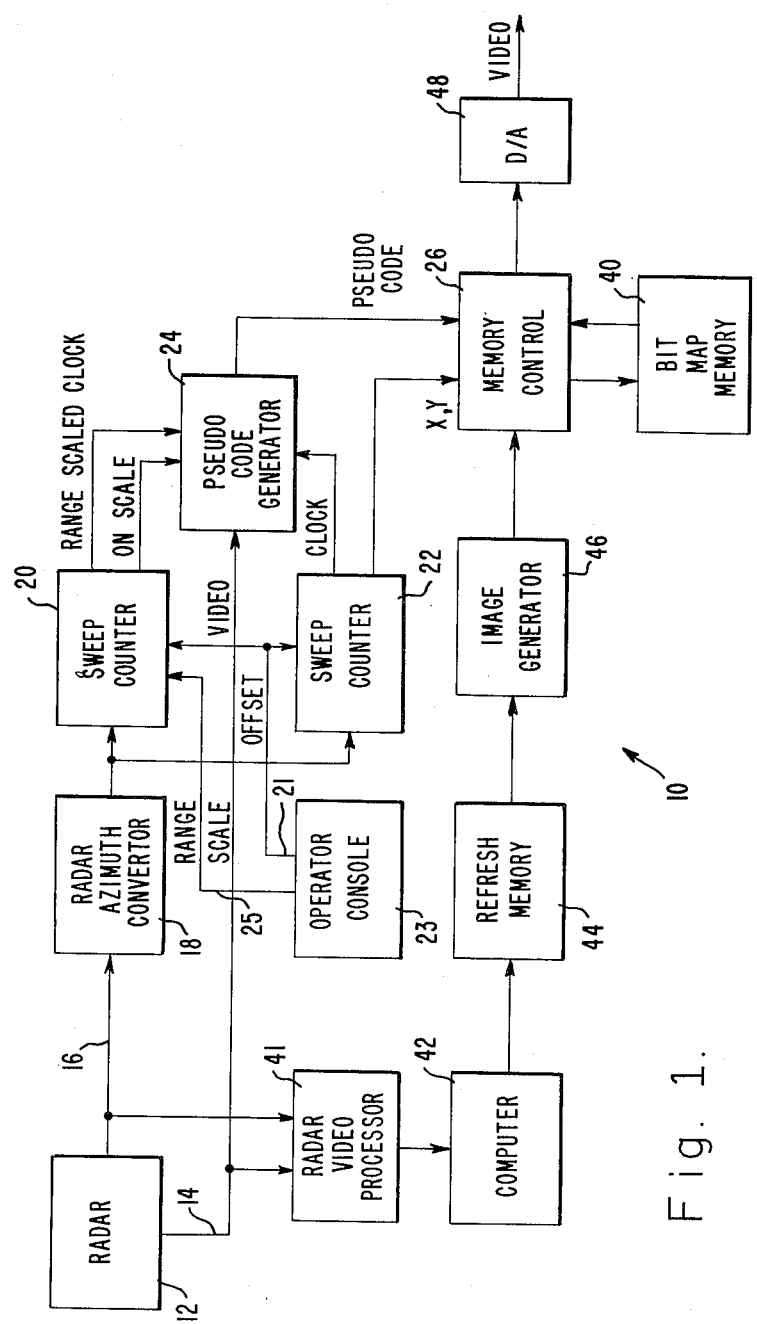
FIG. 1 is a block diagram representation of the system of the present invention.

The invention as shown in FIG. 1 time-shares a single bit map memory to display digital television formated tactical/alpha-numerics and a digital scan converted radar video with synthetic persistance.

The preferred embodiment 10 is shown in FIG. 1 as including a radar receiver 12 which provides a radar video output on line 14 and master trigger and synchronization signals on line 16.

Radar Video

A radar azimuth convertor 18 receives the master trigger and synchronization signals from the radar receiver 12 and converts them into X and Y clocks for sweep counters 20 and 22. The radar azimuth convertor 18 also provides signals representing the sign X and sign Y.

The sweep counters 20 and 22 count the X and Y clocks and utilize the sign X, Y information to determine the radar pointing angle. The operator selected offset is input to the sweep counters 20 and 22 via line 21 from the operator console 23. Similarly, the operator selected range scale is input to sweep counter 20 via line 25. The sweep counter 20 provides range scaled clock outputs and an 'on scale' pulse for a pseudo-code generator 24. Sweep counter 22 provides a constant clock signal to the pseudo-code generator 24 and X and Y addresses for coordinates on scale to a memory control circuit 26.

Figure 2:
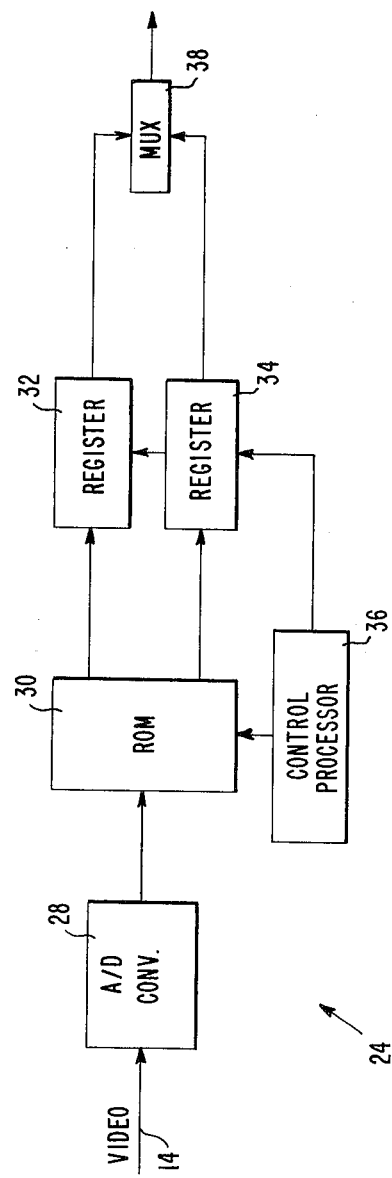
FIG. 2 is a block diagram of the pseudo-code generator of the present invention.

The pseudo-code generator 24 receives video data from the radar receiver 12 via line 14. It uses the 'on scale' pulse to determine when it should start accumulating (storing) the radar video codes. It uses the range scaled clocks to determine how often to sample the radar video. As shown in the simplified block diagram of FIG. 2, the pseudo-code generator 24 includes an analog-to-digital (A/D) converter 28, a read only memory (ROM) 30, shift registers 32 and 34, and a control processor 36.

The A/D converter 28 converts the analog video radar return to a three bit digital code. This code is input to the ROM 30 as an address for the appropriate pseudo-code. Thus, the output of the ROM 30 is the pseudo-code at the address determined by the digital radar video. Table I shows the corresponding codes.

TABLE I

| A/D Code | Pseudo-Code |
|----------|-------------|
| 000 | 000 |
| 001 | 001 |
| 010 | 011 |
| 011 | 011 |
| 100 | 101 |
| 101 | 101 |
| 110 | 111 |

TABLE I-continued

| A/D Code | Pseudo-Code |
|---|---|
| 111 | 111 |

The pseudo-codes are stored in shift registers 32 and 34 on an alternating sweep basis under the control of the processor 36. The outputs of the registers 32 and 34 are multiplexed to a single line by multiplexer 38.

The output of the pseudo-code generator 24 is input to the memory control circuit 26 which controls the loading and unloading of bit map memory 40. The pseudo-code generator 24 provides the coded video data which is to be stored in the bit map memory 40 and the X and Y address provided by sweep counter 22. The pseudo-codes are subsequently clocked into the bit map memory 40.

Alpha-numerics

In an automatic tracking mode, the radar video processor 41 receives the output of the radar receiver, processes it to detect moving targets and reports them to the computer 42. Alpha-numeric data is generated by computer 42 and stored in refresh memory 44. The computer 42 indicates the intensity of each graphics element using the pseudo-codes not used for radar video. See Table II. An image generator 46 calculates the addresses (bit pattern) required by the computer generated alpha-numerics, compiles them and stores them for input to the bit map 40. Using the code shown in Table II, the memory control circuit 26 multiplexes the outputs of the image generator 46 and the pseudo-code generator 24 for input to the bit map memory 40. Table II illustrates how the three bit pseudo-codes may be assigned to the video and alpha-numeric intensity levels.

TABLE II

| Code | Assignment |
|---|---|
| 000 | Black for both tactical/alpha-numeric and radar images. |
| 001 | Least bright radar image. |
| 010 | Least bright tactical/alpha-numeric image. |
| 011 | 3rd level radar image. |
| 100 | 3rd level tactical/alpha-numeric image. |
| 101 | 4th level radar image. |
| 110 | Brightest tactical/alpha-numeric image. |
| 111 | Brightest radar image. |

The update of the alpha-numeric image is accomplished by reading from the memory of the image generator 46 while reading the bit map memory 40. If the bit map memory 40 contains a digital word with a least significant bit (LSB) equal to one, the "OR" value of the corresponding alpha-numeric word and the bit map word at the address is displayed for one frame. The bit map data is subsequently stored in the bit map memory 40.

If, at a given address, the bit map memory 40 contains an LSB equal to zero, the bit map data is cleared to zero and the image data is stored in the bit map memory 40.

For display, the bit map memory is unloaded continuously at a T.V. rate via a digital-to-analog convertor 48.

The shade change for the synthetic persistence radar video should nominally occur at the radar rotation rate. Thus, for a maximum strength moving target seen on a radar with a rotation rate of 10 RPM, each radar history will last for 24 seconds. The radar trail will consist of four histories, each at a different shade of gray. The weakest detectable moving target seen on the 10 RPM radar will have six seconds of radar history, at the least bright shade of gray. The Table III below illustrates the appearance of each of the four visible signal strengths for moving targets.

TABLE III

| Signal Strength | Pseudo-Code | Displayed Positions | History Time |
|---|---|---|---|
| 4 | 111 | 4 | 24 seconds |
| 3 | 101 | 3 | 18 seconds |
| 2 | 011 | 2 | 12 seconds |
| 1 | 001 | 1 | 6 seconds |

The shade change is accomplished by addressing a digital sweep pattern into the bit map memory 40 (this requires the entire memory to be cleared during either a range scale or offset change). The bit map value is read, decreased one shade, compared with the pseudo code output of the range register, and the larger of the two values is stored into the bit map memory 40. This approach reduces the stored pseudo-code bit pattern (indicated by an lsb equal to one) by one shade of gray at a regular interval while clearing and recreating the complete tactical/alpha-numeric bit pattern (indicated by an lsb equal to zero) at a much more frequent interval.

The "crawling worm" effect can be created in this type of scan convertor by gating the video as a function of the digital code. For example:

000 always blanked
001 unblanked 0–100 ms. out of 1 sec.
010 always unblanked
011 unblanked 101–200 ms. out of 1 sec.
100 always unblanked
101 unblanked 201–300 ms. out of 1 sec.
110 always unblanked
111 unblanked 301–500 ms. out of 1 sec.

By adjusting the threshold of the A/D convertor downward, weaker moving targets would present more shades of gray and hence a "crawling worm". Non-moving targets would not crawl but be displayed at a uniform brightness level during their respective unblank periods.

While the present invention has been described herein with reference to a particular embodiment, it is to be understood that the invention is not limited thereto. Those having ordinary skill in the art will recognize that the invention is equally applicable to sonar systems for example. The particular techniques for generating the alpha-numeric data disclosed herein is also not critical. With the teachings of this invention, any two signals may be encoded and combined for memory and subsequent readout or display. It is contemplated by the appended claims to cover any and all such modifications.

What is claimed is:

1. A system for substantially simultaneous raster scan display of video information and alpha-numeric data on a single display comprising:
   first means for providing first and second electrical signals representing the location and spatial intensity distribution of a video signal respectively;
   second means for encoding said second electrical signals by assigning first specified bit patterns from a first predetermined set to said second electrical signals;
   third means for generating third and fourth electrical signals representing the location and spatial intensity distribution of alpha-numeric data, said fourth electrical signals being encoded with second specified bit patterns from a second predetermined set;

first memory for storing said encoded second and fourth signals at addresses determined by said first and third signals respectively; and fourth means for sequentially reading out encoded information from said first memory including means for detecting said first and second specified bit patterns and controlling a display presentation responsive thereto whereby the spatial intensity distributions represented by said first and second specified bit patterns are visually differentiated on a display.

2. The system of claim 1 wherein said fourth means includes memory control means for controlling the loading and unloading of said encoded second and fourth signals into and out of said first memory respectively.

3. The system of claim 2 wherein said first means includes a radar receiver.

4. The system of claim 2 wherein said second means includes a pseudo-code generator.

5. The system of claim 2 wherein said third means includes a computer, second memory means for refreshing the output of said computer and an image generator.

6. The system of claim 4 wherein said pseudo-code generator includes:

an analog-to-digital converter for transforming said second electrical signals into digital signals; and a read only memory for assigning first specified bit patterns from a first specified set to said second signals.

7. The system of claim 6 including a control processor and third memory means for unloading said read only memory.

8. A system for substantially simultaneous raster scan display of video information and alpha-numeric data on a single display comprising:

first means for providing first and second electrical signals representing the location and spatial intensity distribution of a video signal respectively;

pseudo-code generating means, for encoding said second electrical signals by assigning first specified bit patterns from a first predetermined set to said second electrical signals, including an analog-to-digital convertor for transforming said second electrical signals into digital signals and a read only memory for assigning said first specified bit patterns to said second electrical signals;

third means, for generating third and fourth electrical signals representing the location and spatial intensity distribution of alpha-numeric data, said fourth electrical signals being encoded with second specified bit patterns from a second predetermined set, including a computer for generating such data, second memory means for refreshing the output of said computer and an image generator for transforming said computer output into image form;

first memory for storing said encoded second and fourth signals at addresses determined by said first and third signals respectively; and fourth means for sequentially reading out encoded information from said first memory including means for detecting said first and second specified bit patterns and controlling a display presentation responsive thereto wherein said fourth means includes memory control means for controlling the loading and unloading of said encoded second and fourth signals into and out of said first memory respectively, whereby the spatial intensity distributions represented by said first and second specified bit patterns are visually differentiated on a display.

9. A method for substantially simultaneous raster scan display of video information and alpha-numeric data on a single display comprising the steps of:

transforming received video signals into encoded second signals by assigning first specified bit patterns from a first predetermined set to said video signals;

generating third alpha-numeric signals encoded with second specified bit patterns from a second predetermined set;

multiplexing said second and third encoded signals into a memory; and sequentially reading out encoded information from said memory and detecting said first and second specified bit patterns and controlling a display presentation responsive thereto whereby video information from said received video signals encoded in said second signals with said first specified bit patterns is visually differentiated on a display from alpha-numeric data encoded in said third alpha-numeric signals with said second specified bit patterns.

* * * * *